United States Patent [19]
Falk et al.

[11] Patent Number: 4,594,000
[45] Date of Patent: Jun. 10, 1986

[54] METHOD AND APPARATUS FOR OPTICALLY MEASURING DISTANCE AND VELOCITY

[75] Inventors: Robert A. Falk, Louisville; Gary L. Phillis, Boulder, both of Colo.

[73] Assignee: Ball Corporation, Broomfield, Colo.

[21] Appl. No.: 481,987

[22] Filed: Apr. 4, 1983

[51] Int. Cl.$^4$ .......................... G01C 3/08; G01P 3/36
[52] U.S. Cl. ...................................... 356/5; 356/28.5
[58] Field of Search ................ 356/5, 28, 28.5; 343/9; 367/90; 372/20

[56] References Cited

U.S. PATENT DOCUMENTS

| | | | |
|---|---|---|---|
| 3,663,897 | 5/1972 | Broom | 372/20 X |
| 3,825,340 | 7/1974 | Debart | 356/5 |
| 3,841,755 | 10/1974 | Debart | 356/28 |
| 4,025,194 | 5/1977 | Teppo | 356/5 |
| 4,051,371 | 9/1977 | Dewey, Jr. et al. | 250/343 X |
| 4,140,060 | 2/1979 | Brenner | 102/214 |
| 4,186,355 | 1/1980 | Lo | 372/20 X |
| 4,190,362 | 2/1980 | Dubrunfaut | 356/5 |
| 4,292,606 | 9/1981 | Trimmel | 372/7.51 |

OTHER PUBLICATIONS

Hulme, Collins, Constant, Pinson; "A $CO_2$ Laser Rangefinder Using Hetrodyne Detection and Chirp Pulse Compression"; (1981) Opt. Quantum Electronics.

Primary Examiner—Stephen C. Buczinski
Assistant Examiner—Linda J. Wallace
Attorney, Agent, or Firm—Sheridan, Ross & McIntosh

[57] ABSTRACT

An apparatus is provided for use in determining the distance and velocity of a distant object. The apparatus employs a low energy optical radiation source that emits identical external and internal radiation signals whose wavelengths are swept. The wavelength sweep is induced by varying the magnitude of an electrical input supplied to the optical radiation source. An external ranging system employs common optical means, including polarizing means, to direct the external signal towards a distant object, and to receive a portion of that signal which reflects off of the object. First optical heterodyne means are provided to mix the reflected external signal and a local oscillator signal derived from the external optical radiation signal, to produce an output signal. Means are provided to determine representative values of the frequency of that output signal. An internal processing system directs the internal signal into an optical delay means of a known length. Upon exiting the optical delay means, the delayed internal signal is received by a second optical heterodyne means and mixed therein with a local oscillator signal derived from the internal optical radiation signal. Means are provided to determine a representative value of the frequency of the output signal from the second optical heterodyne means. Additional means are provided to determine the central frequency of the external and internal optical radiation signals. Finally, processor means utilize the representative frequency values derived from the external ranging system and internal processing system, and the central frequency value, to calculate the distance and velocity of the distant object.

14 Claims, 3 Drawing Figures

METHOD AND APPARATUS FOR OPTICALLY MEASURING DISTANCE AND VELOCITY

FIELD OF THE INVENTION

The present invention relates to telemetry and the use of optical radiation to measure the distance and speed of a distant object, and more particularly, to sweeping the wavelength of the optical radiation to obtain the distance and velocity measurements.

BACKGROUND OF THE INVENTION

It is known that telemetry systems can comprise an apparatus that emits optical radiation pulses towards a distant object, and which measures the time that the optical radiation pulses take to reach the object and return to the apparatus. The pulse travel times can then be used to determine the distance of the object. Such devices are known to employ direct detection means to receive the reflected optical radiation.

Further, it is known to modulate the frequency of the emitted optical radiation signal so that optical heterodyne detection means can be employed. Optical heterodyne detection means allow for detection at the quantum noise limit and, as a result, are significantly more sensitive than direct detection means. As such, the use of optical heterodyne detection means minimizes energy requirements while maximizing range, accuracy, and reliability characteristics. An additional advantage of employing optical heterodyne detection means, over direct detection means, is the ability to determine the radial velocity of an object by measuring the Doppler frequency shift.

When using optical heterodyne detection means, it is known to employ an optical system that directs the emitted optical radiation signal towards the distant object, and concentrates the reflected, or return, optical radiation signal for optimal heterodyne detection. The addition of optical polarizing means to such an optical system allows for selective reception of the return optical radiation signal, thereby maximizing the reliability of the optical heterodyne detection means.

DISCLOSURE OF THE INVENTION

The present invention is directed to an improved distance and velocity measuring apparatus which operates at a low energy input and power output level, and offers optimal range, accuracy and reliability capabilities. The apparatus includes an optical radiation source which simultaneously emits identical external and internal low power, optical radiation signals that are swept in wavelength. The sweep rate of the wavelength of the signals increases and decreases according to a linear, up-and-down ramp. The wavelength is swept by merely varying the magnitude of a small electrical input to the optical radiation source. Relative to other prior art devices that employ optical radiation modulation techniques, the aforementioned method for sweeping the wavelength of optical radiation that is used in the present invention requires a lower average input energy, and allows for sweeping the emitted optical radiation signals across a much wider range of frequencies. As a result, the present invention can achieve a higher degree of accuracy than many of the prior art telemetry systems.

The external and internal optical radiation signals are separately employed in an external ranging system and internal processing system respectfully, which comprise the apparatus. Each of the systems output frequency measurements used to calculate the distance and velocity of a distant object.

The external ranging system includes optical components that are used to direct the external optical radiation signal towards the object whose distance and velocity are to be measured. Upon reflecting off of the object, a portion of the external optical radiation signal will return to the apparatus. Optical polarizing means are provided within the external ranging system to realize the aforementioned benefits, and are incorporated in a manner that allows the external return optical radiation signal to be received through many of the same optical components that are used to direct the emitted external optical radiation signal towards the object. The use of common optical components for both emission and reception of the external optical radiation signal reduces the weight, volume and complexity of the apparatus. Additional optical components and filter means are provided to concentrate and selectively receive the external return optical radiation signal to maximize the reliability of the detection means included in the apparatus.

The external ranging system further includes optical heterodyne means for high sensitive reception of the external return optical radiation signal. The optical components of the external ranging system are arranged so that a small portion of the emitted external optical radiation signal is internally reflected back through the optical components and filter means, and received by the optical heterodyne detection means as a local oscillator signal. This method of obtaining a local oscillator signal allows for optimal overlap of the external return and local oscillator signals, thereby maximizing the reliability and accuracy of the optical heterodyne detection means. In addition, the use of common optical components for transmitting and receiving the external signal, external return signal and corresponding local oscillator signal minimizes the likelihood of error that may arise when the optical components include aberations or other imperfections.

In addition to receiving the local oscillator and external return radiation signals within the external ranging system, the optical heterodyne detection means also mixes the two optical radiation signals to produce an electrical output signal. Use of the optical heterodyne means to both receive and mix the local oscillator and external return signals allows for optical radiation detection at the quantum noise level. As such, the present invention has greater range, accuracy and reliability capabilities than many prior art telemetry systems that employ separate noise producing means for receiving and mixing optical radiation signals. The frequency of the output signal from the optical heterodyne detection means within the external ranging system is $f+S$ or $f-S$. Representative frequency values for $f+S$ and $f-S$ are obtained by measurement, then employed to calculate separate values for $f$ and $\pm S$.

The internal processing system of the present invention includes means for measuring the central frequency $F$ of the internal optical radiation signal. That frequency value also represents the central frequency of the external optical radiation signal since the external and internal optical radiation signals are identical. Optical directing means are provided within the internal processing system to direct the internal optical radiation signal at a reflective surface located within an optical delay means included in the apparatus. Upon reflecting off of the reflecting surface in the optical delay means, the reflected internal optical radiation signal will exit the optical delay means and be received by optical heterodyne means. The internal processing system is arranged so that a small portion of the internal optical radiation signal is received by the optical heterodyne means without traveling in and out of the optical delay means. That signal acts as a local oscillator signal, and is mixed with the reflected portion of the internal optical radiation signal within the optical heterodyne means to produce an electrical output signal. The frequency f' of the output signal is then measured and a representative value thereof is obtained.

The apparatus employs the values for f and f' measured by the external ranging system and internal processing system respectfully, to determine, in a novel manner, the distance of the object. In addition, the apparatus uses the values for S and F measured by the external ranging system and internal processing system respectfully, to determine, in a known manner, the velocity of the object.

DETAILED DESCRIPTION OF THE PREFERRED EMBODIMENT

Figure 1:
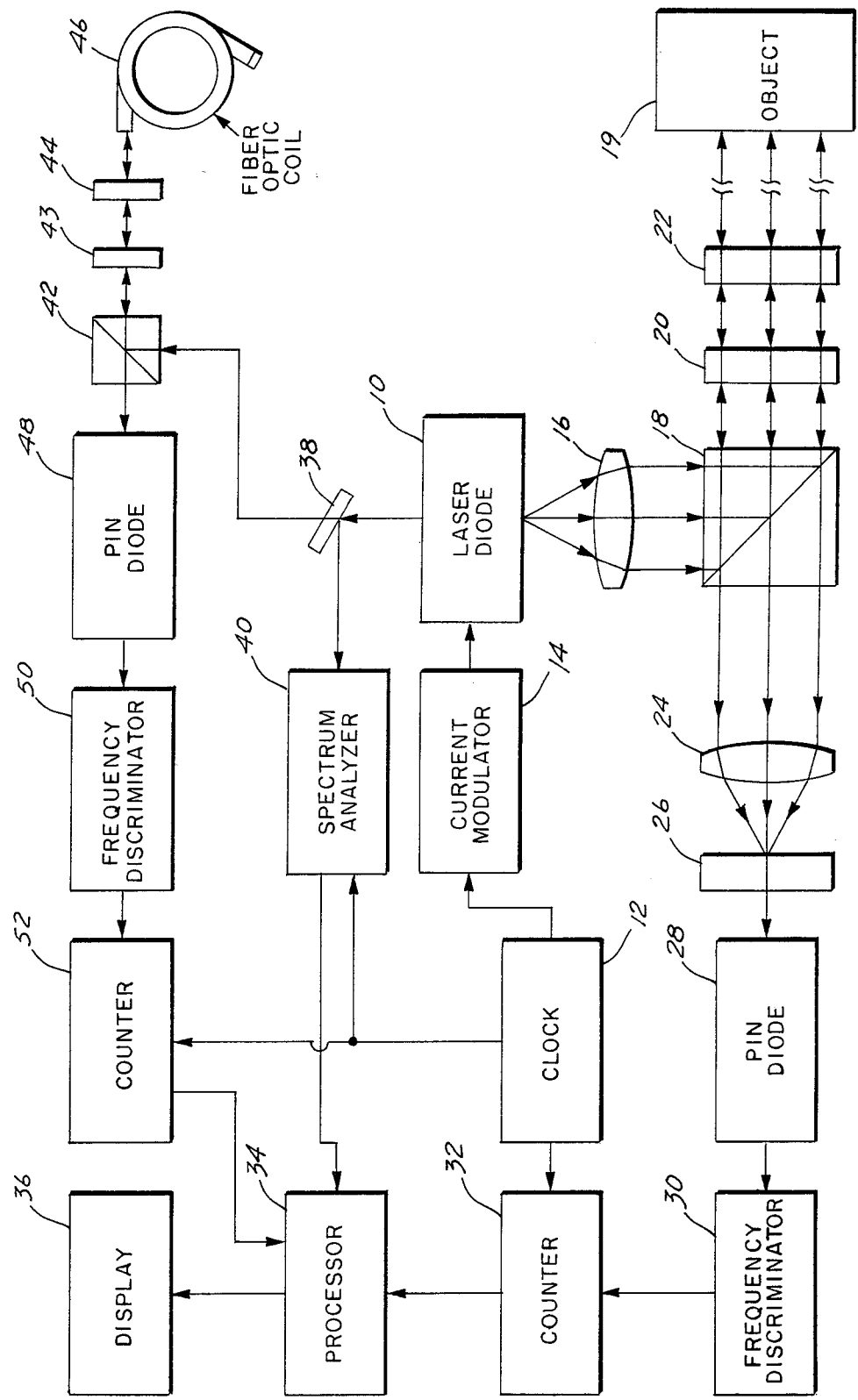
FIG. 1 is a block diagram showing the components of the present invention.

In accordance with the preferred embodiment of this invention, FIG. 1 shows a block diagram of the components of the apparatus. A single mode laser diode 10 emits a single burst of linearly polarized optical radiation that is swept in wavelength by varying an electrical input current to the laser diode 10. The wavelength sweep of the emitted optical radiation is realized since the wavelength of the optical radiation is dependent upon the temperature of the laser diode 10, and in turn, the temperature of the laser diode 10 is dependent upon the amperage of the electrical input current.

The emission of the optical radiation from the diode 10 is controlled by a clock 12 which simultaneously controls a current modulator 14 that modulates the amperage of the electrical input current to the laser diode 10. The frequency of the resultant wavelength sweep of the emitted optical radiation is centered about a frequency F. The relationship between wavelength and frequency is well known in the art. The sweep rate of the wavelength increases and decreases across a relatively constant frequency range according to a linear, up-and-down ramp. By way of example the frequency range may be as large as 100 gigahertz.

The optical radiation burst from the laser diode 10 creates identical external and internal optical radiation signals that are employed separately by an external ranging system and internal processing system respectively, that comprise the apparatus. Each of the systems provide certain frequency measurements used to calculate the distance and velocity of a distant object.

Within the external ranging system, the external, linearly polarized optical radiation signal from the laser diode 10 is initially collimated by collimating optics 16 and then merged into an optical path through a polarization dependent beam splitter 18. The object 19 whose distance and velocity are to be measured, lies somewhere within said optical path. A quarter wave retardation plate 20 converts the external linearly polarized optical radiation signal to right hand circularly polarized optical radiation. Substantially all, (approximately 99%), of the external optical radiation signal then passes through a local oscillator reflector plate 22 towards the object 19.

The external optical radiation signal reflects off of the object 19, and is thereby converted from right hand circularly polarized optical radiation to left hand circularly polarized optical radiation. A portion of the reflected, or return, external optical radiation signal follows the aforementioned optical path and passes back through the local oscillator reflector plate 22. Upon passing through the quarter wave retardation plate 20 the external return optical radiation signal is converted from left hand circularly polarized optical radiation to linearly polarized optical radiation that is orthogonal to the linear polarization of the external optical radiation signal initially emitted by the laser diode 10. As such, the external return optical radiation signal passes through the polarization dependent beam splitter 18 undeflected, and is then concentrated by collecting optics 24. A spatial filter 26 allows only a selected portion of the concentrated external return signal to pass through and be received by a PIN diode optical heterodyne detector 28. Conversion of the polarization of the external optical radiation signal in the aforesaid manner allows for the use of common optical components to both send and receive the external optical radiation signal, thereby minimizing the weight, size and complexity of the apparatus.

A very small portion of the external optical radiation signal emitted from the laser diode 10 never leaves the apparatus as it is reflected off of the local oscillator reflector plate 22 within the external ranging system. Upon reflection, this local oscillator signal follows the same path to the PIN diode optical heterodyne detector 28 as described above with regard to the external return signal. The external return signal and local oscillator signal are photomixed in the PIN diode optical heterodyne detector 28 to produce an electrical output signal. The method described herein for obtaining a local oscillator signal guarantees proper overlap of the local oscillator signal and external return signal for heterodyning, thereby optimizing the accuracy and reliability of the apparatus. In addition, use of the optical heterodyne detector 28 to both receive and mix the external return and local oscillator signals allows for detection of the signals at the quantum noise limit.

A narrow-banded frequency discriminator 30 is included in the external ranging system to lock onto the electrical output singal of the PIN diode optical heterodyne detector 28. By way of example, the frequency discriminator 30 may be a phase lock loop comprised of a phase comparator, integrator and voltage controlled oscillator. When locked, the frequency discriminator 30 will be running at a frequency of f+S or f−S. The frequency f represents a frequency difference between the external return optical radiation signal and the local oscillator signal, while the frequency S represents the Doppler frequency shift which occurs when the object 19 is moving.

Figure 2:
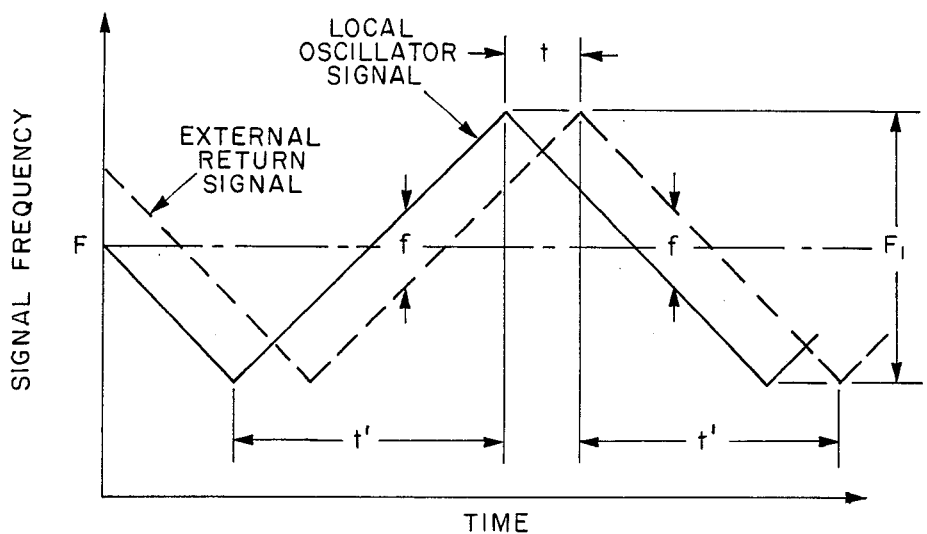
FIG. 2 is a graph showing the relationship between signal frequency and time for an external return optical radiation signal and the corresponding local oscillator signal that are received when the object is not moving.

FIG. 2 is a graph representing the relationship between signal frequency and time for an external return signal and the corresponding local oscillator signal which are received by the PIN diode optical heterodyne detector 28 when the object 19, whose distance and velocity are to be measured, is not moving. As shown, the wavelengths of the two signals are centered about a common central frequency F, and sweep a common frequency range of $F_1$. The offset in time between the signals, t, represents the total time required for the corresponding external optical radiation signal to reach the object 19 and return to the PIN diode optical heterodyne detector 28. The frequency f, as noted above, represents the frequency difference between the external return optical radiation signal and the corresponding local oscillator signal. Since the object 19 is not moving, the Doppler frequency shift S is zero, and is therefore not shown on the graph.

Figure 3:
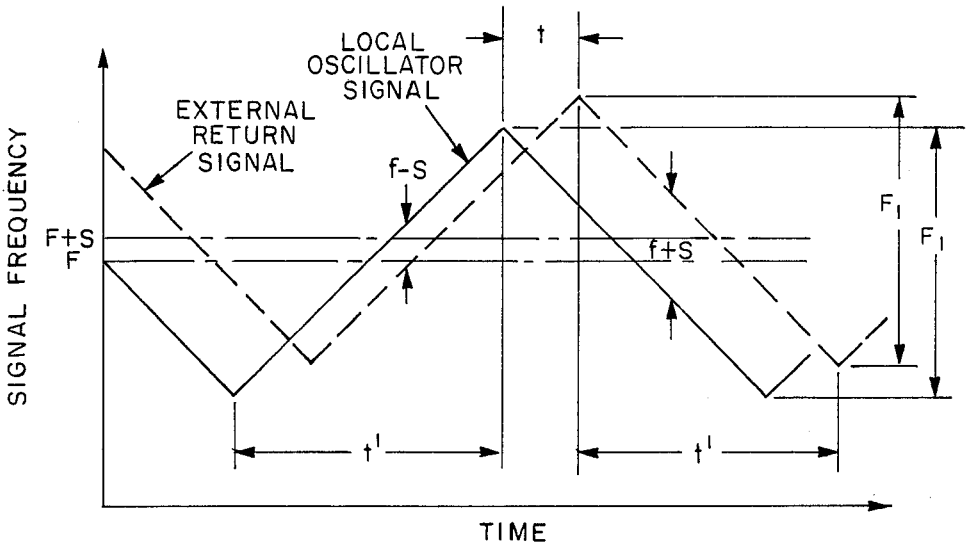
FIG. 3 is a graph showing the relationship between signal frequency and time for an external return optical radiation signal and the corresponding local oscillator signal that are received when the object is moving towards the apparatus of the present invention.

FIG. 3 is a graph representing the relationship between signal frequency and time for an external return optical radiation signal and the corresponding local oscillator signal which are received by the PIN diode optical heterodyne detector 28 when the object 19 is moving towards the apparatus. The graph is quite similar to the graph shown in FIG. 2 with the exception that the central frequency of the wavelength of the local oscillator signal is F, while the central frequency of the wavelength for the external return signal is F+S. As noted above, the incremental frequency S represents the Doppler frequency shift which results due to the movement of the object 19. If the object 19 was moving away from the apparatus the central frequency for the external return signal would be F−S.

The external ranging system further comprises a counter 32, in electrical connection with the clock 12 and the frequency discriminator 30, which measures the frequency of the optical heterodyne detector 28 output signal that is locked onto by the frequency discriminator 30. Such a frequency measurement is made for each up and down wavelength sweep of the output signal that occurs as a result of the aforementioned optical radiation burst. The frequency measurements for the up and down sweeps will be f+S or f−S. Each frequency measurement is outputted by the counter 32 to a processor 34. After all of the frequency measurements for a single optical radiation burst are received by the processor 34, the processor 34 determines a single representative value for both f+S and f−S. By adding such values for f+S and f−S, then dividing by two, the processor 34 finds a value for f. Similarly, by differencing the values for f+S and f−S, then dividing by two, the processor 34 determines ±S.

Within the internal processing system, a very small portion of the internal, linearly polarized optical radiation signal from the laser diode 10 is diverted by a deflector plate 38 into a spectrum analyzer 40. The spectrum analyzer 40 measures the central frequency F of the internal optical radiation signal, and provides its measurement of F to the aforementioned processor 34. The undiverted portion of the internal optical radiation signal passes through the deflector plate 38, and is redirected through a polarization dependent beam splitter 42 towards a polarization holding fiber optic coil 46. A quarter wave retardation plate 43 converts the internal, linearly polarized optical radiation signal to right hand circularly polarized optical radiation. Substantially all of the internal optical radiation signal then passes through a local oscillator plate 44, and into the fiber optic coil 46. The fiber optic coil 46, acts as a signal delay line within the internal processing system.

The internal optical radiation signal passes through the polarization holding fiber optic coil 46, and upon encountering a reflective surface at the end of the fiber optic coil 46, is reflected back out of the fiber optic coil 46. The internal optical radiation signal is converted from right hand circularly polarized optical radiation to left hand circularly polarized optical radiation when it reflects off of the reflective surface within the fiber optic coil 46. Upon passing through the quarter wave retardation plate 43 the reflected, or return, internal optical radiation signal is converted from left hand circularly polarized optical radiation to linearly polarized optical radiation that is orthogonal to the linear polarization of the internal signal initially emitted by the laser diode 10. Consequently, the internal return optical radiation signal will pass through the polarization dependent beam splitter 42 undeflected. A PIN optical heterodyne detector 48 within the internal processing system receives the internal return optical radiation signal.

A very small portion of the internal optical radiation signal never enters the polarization holding fiber optic coil 46 within the internal processing system, as it is reflected off of the local oscillator plate 44 to provide a local oscillator signal. The local oscillator signal passes through the polarization dependent beam splitter 42 undeflected, and is also received by the PIN diode optical heterodyne detector 48.

The PIN diode optical heterodyne detector 48 mixes the internal return optical radiation signal and corresponding local oscillator signal to produce an electrical output signal. A narrow-banded frequency discriminator 50 locks onto the output signal. When locked, the frequency discriminator will be running at a frequency of f'. The frequency f' represents the frequency difference between the internal return optical radiation signal and corresponding local oscillator signal within the internal processing system. A counter 52, in electrical connection with the clock 12 and frequency discriminator 50, measures the frequency of the optical heterodyne detector 48 output signal that is locked onto by the frequency discriminator 50. Such a frequency measurement is made for each up and down wavelength sweep of the output signal that occurs as a result of the aforementioned optical radiation burst. Each frequency measurement is outputted by the counter 32 to the processor 34. After all of the frequency measurements for a single optical radiation burst are received by the processor 34 from the counter 52, the processor 34 determines a single representative value for f'.

Upon determining values for f, S, f' and F, the processor 34 calculates the distance d and velocity v of the object 19. The distant d is calculated by the processor 34 according to the formula set forth below:

$$d = (f/f')d'.$$

In this formula, d' is the distance the internal optical radiation signal travels as it passes from the laser diode 10, in and out of the polarization holding fiber optic coil 46, to the PIN diode optical heterodyne detector 48. The value for d' is known and engineered into the apparatus so that once the processor 34 has determined values for f and f', the distance d of the object 19 can be calculated by the processor 34, and displayed on a display 36.

The velocity v of the object 19 is calculated by the processor 34 according to the formula set forth below:

V=Sc/F.

In this formula, c is the speed of light, and is therefore equal to the speed at which the external optical radiation signal travels to and from the object 19. The value of c is known and engineered into the apparatus so that once the processor 34 has determined values for F and S, the velocity v of the object 19 can be calculated by the processor 34 and displayed on the display 36. In addition, since the sign of S is also determined by the processor 34, the display 36 can indicate whether the object 19 is moving towards or away from the apparatus.

Based on the above detailed description, salient features of the present invention can be easily recognized. The disclosed apparatus employs a low energy optical radiation source that emits identical external and internal optical radiation signals whose wavelengths are swept. The wavelength sweep is induced by varying the amperage of an electrical current supplied to the optical radiation source. An external ranging system employs common optical means, including optical polarizing means, to direct the external optical radiation signal towards an object, and to receive a portion of that signal which reflects off of the object. First optical heterodyne means are provided to mix the reflected external signal and a local oscillator signal derived from the external optical radiation signal, to produce an output signal. Means are provided to determine representative frequency values of that output signal. An internal processing system directs the internal optical radiation signal into an optical delay means of a known length. Upon exiting the optical delay means, the delayed internal signal is received by a second optical heterodyne means and mixed therein with a local oscillator signal derived from the internal optical radiation signal. Means are provided to determine a representative value of the frequency of the output signal from the second optical heterodyne means. Additional means are provided to determine the central frequency of the external and internal optical radiation signals. Finally, processor means utilize the representative frequency values derived from the external ranging system and internal processing system, and the central frequency value, to calculate the distance and velocity of the distant object.

What is claimed is:

1. In an apparatus for optically making measurements relating to an object, an assembly comprising:
    an optical radiation source that simultaneously emits identical first and second modulated optical radiation signals;
    first means reponsive to said optical radiation source for providing a first data signal relating to said first optical radiation signal when a portion of said first optical radiation signal travels to and from said objects;
    second means responsive to said optical radiation source for providing a second data signal relating to said second optical radiation signal when a portion of said second optical radiation signal travels a known distance; and
    third means that employs said first data signal to determine a first frequency difference that arises when said portion of said first optical radiation signal travels to and from said object, and that employs said second data signal to determine a second frequency difference that arises when said portion of said second optical radiation signal travels said known distance, and wherein said first and second frequency differences and said known distance are employed to determine the distance of said object.

2. An assembly, as recited in claim 1, wherein said optical radiation source is a single mode laser diode, and wherein said first and second optical radiation signals emitted by said laser diode are swept in wavelength in direct response to an electric current of varying magnitude that is supplied directly to said laser diode.

3. An assembly, as recited in claim 1, wherein said second frequency difference arises when said second optical radiation signal travels through an optical delay means included in said assembly.

4. An assembly, as recited in claim 3, wherein said optical delay means is a polarization holding fiber optic coil.

5. An assembly, as recited in claim 1, further comprising a fourth means responsive to said optical radiation source for determining the central frequency of said first and second optical radiation signals.

6. An assembly, as recited in claim 5, wherein said third means employs said first data signal to determine frequency shift of said first optical radiation signal that arises when said first optical radiation signal travels to and from said object, and wherein said third means employs said central frequency and said frequency shift to determine the velocity of said object.

7. An assembly, as recited in claim 1, wherein said first means comprises:
    optical sending means for directing said first optical radiation signal towards said object;
    reflecting means for reflecting a portion of said first optical radiation signal to obtain a local optical radiation signal;
    optical receiving means for receiving said local optical radiation signal and a portion of said first optical radiation signal that reflects off of said object;
    mixing means for optically mixing said local optical radiation signal and a portion of said first optical radiation signal that reflects off of said object, to produce an electrical output; and
    counter means responsive to said electrical output for providing said first data signal.

8. An assembly, as recited in claim 7, wherein said optical sending means and optical receiving means comprise optical radiation polarizing means.

9. An assembly, as recited in claim 7, wherein said optical sending means and optical receiving means comprise common optical components and common optical radialion polarizing means.

10. An assembly, as recited in claim 1, wherein said first optical radiation signal is directed out of said apparatus towards said object, and wherein said second optical radiation signal is not directed at said object.

11. A method for use in optically determining distance and velocity of an object, comprising the steps of:
    simultaneously emitting identical first and second optical radiation signals of a swept wavelength;
    determining a first frequency difference and a frequency shift that occur when said first optical radiation signal travels to and from said object;

determining a second frequency difference of said second optical radiation signal;

determining the central frequency of said first and second optical radiation signals;

employing said first and second frequency differences to determine the distance of said object; and employing said frequency shift and central frequency to determine the velocity of said object.

12. A method, as recited in claim 11, wherein said emitting step includes varying the magnitude of an electrical input to a single mode laser diode to sweep the wavelength of said first and second optical radiation signals that are emitted from said single mode laser diode.

13. A method for use in optically making measurements relating to an object, comprising the steps of:

simultaneously emitting identical first and second modulated optical radiation signals;

determining a first frequency difference that arises when said first optical radiation signal travels to and from said object;

determining a second frequency difference that arises when said second optical radiation signal travels a known distance; and employing said first and second frequency differences and said known distance to determine the distance of said object.

14. A method, as recited in claim 13, further comprising:

determining a first frequency shift that arises when said first optical radiation signal travels to and from said object;

determining the central frequency of said first and second optical radiation signals; and employing said frequency shift and said central frequency to determine the velocity of said object.

* * * * *

UNITED STATES PATENT AND TRADEMARK OFFICE
CERTIFICATE OF CORRECTION

PATENT NO. : 4,594,000

DATED : June 10, 1986

INVENTOR(S) : Falk et al.

It is certified that error appears in the above—identified patent and that said Letters Patent is hereby corrected as shown below:

In Column 7, line 60, delete the word "objects" and insert -- object --.

In Column 8, line 57, delete the word "radialion" and insert -- radiation --.

Signed and Sealed this

Twentieth Day of January, 1987

Attest:

DONALD J. QUIGG

Attesting Officer

Commissioner of Patents and Trademarks